United States Patent Office 3,311,564
Patented Mar. 28, 1967

3,311,564
OXYLUMINESCENT COMPOSITIONS CONTAIN-
ING DEHYDRATING AGENTS
Edward T. Cline, Wilmington, Del., assignor to E. I. du
Pont de Nemours and Company, Wilmington, Del., a
corporation of Delaware
No Drawing. Filed Nov. 1, 1965, Ser. No. 506,620
9 Claims. (Cl. 252—188.3)

This application is a continuation-in-part of my copending application Ser. No. 429,928, filed Feb. 2, 1965.

This invention relates to chemiluminescent compositions. More particularly, it relates to oxyluminescent compositions that are capable of uniform and reproducible light emission on exposure to the atmosphere, and when floated on water.

Certain tetrakis(disubstituted-amino)ethylene compositions are known to luminesce when exposed to oxygen. It is also known that a small amount of water, alcohol, or other protonic material must be present for light to be emitted by such compositions. However, use of certain oxyluminescent compositions in various applications has often resulted in non-uniform and non-reproducible light emission, especially when the compositions are exposed to a humid atmosphere. While water is an activator for oxyluminescence of these peraminoethylenes, it tends to increase excessively the rate of luminescence when used at higher concentrations and eventually acts as a quenching agent in high concentrations. These two effects apparently explain the erratic results mentioned above.

The present invention provides a means for obtaining uniform, reproducible light emission from oxyluminescent compositions. The invention comprises an oxyluminescent tetrakis(disubstituted-amino)ethylene and from 2% to 200%, by weight of the peraminoethylene, of a dehydrating agent that is inert to the peraminoethylene and its oxidation products, or an alkali or alkaline earth metal hydroxide (or a compound that reacts with water to form an alkali or alkaline earth metal hydroxide).

The oxyluminscent tetrakis(disubstituted-amino)-ethylenes that are operable in the compositions of this invention include those having the formula $$(R_2N)_2C=C(NR_2)_2$$

wherein the R's are the same or different and are monovalent alkyl or cycloalkyl of up to 10 carbon atoms, divalent alkylene joined to the other R attached to the same nitrogen to form a 3–5 membered monoaza heterocycle, and divalent alkylene joined to an R attached to a second nitrogen to form a 3–7 membered diaza heterocycle.

Specific tetrakis(disubstituted-amino)ethylenes operable as the oxyluminescent material in the compositions of this invention include tetrakis(dimethylamino)ethylene,
tetrakis(N-pyrrolidinyl)ethylene,
1,1′,3,3′-tetramethyl-Δ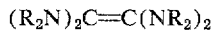2,2′-bi(imidazolidine),
1,1′,3,3′-tetraethyl-Δ2,2′-bi(imidazolidine),
1,1′-diethyl-3,3′-dimethyl-Δ2,2′-bi(imidazolidine),
1,1′,3,3′-tetramethyl-Δ2,2′-bi(hexahydropyrimidine), and
tetrakis(dimethylaminomethyleneamino)ethylene.

Of these, tetrakis(dimethylamino)ethylene is especially suitable.

The tetrakis(dimethylamino)ethylene can be prepared by reaction of dimethylamine with chlorotrifluoroethylene as described in J. Am. Chem. Soc. 72, 3646 (1950). The other tetrakis(disubstituted-amino)ethylenes of the above general formula and the bis(disubstituted-amino) hydrocarbyloxymethanes intermediate thereto can be prepared by reaction of the requisite basic secondary amine and any amide acetal, i.e., any disubstituted-amino-dihydrocarbyloxymethane in accord with the following stoichiometry:

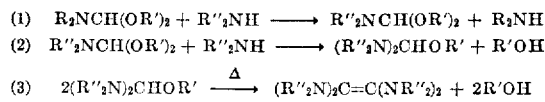

wherein the R's, which can be alike or different, are monovalent alkyl or cycloalkyl radicals, generally, of no more than eight carbons each, which can be together joined (in a divalent radical) to form with the intervening nitrogen a heterocycle of from three to seven ring members; the R′s, which can also be alike or different, or together joined, are monovalent (or divalent) alkyl, aryl, aralkyl, alkaryl, or cycloalkyl radicals, generally of no more than eight carbons each, and when together joined, form with the two oxygens and intervening carbon a 1,3-dioxaheterocycle of from five to seven ring members; and the R″s, which can also be alike or different or together joined, are monovalent (or divalent) alkyl or cycloalkyl hydrocarbon or oxa- and/or azahydrocarbon radicals of no more than eight carbons each, each nitrogen carrying no more than one methyl group and, in the case of the divalent radicals, no more than 6 carbons per divalent radical. In any event, when the two R″s are together joined, they form with the indicated amine nitrogen a monoazacarbocycle, an oxaazacarbocycle, or a diazacarbocycle of from three to seven ring members. This process is described in greater detail in copending application Ser. No. 174,404, filed Feb. 20, 1962 by Hilmer E. Winberg, now U.S. Patent 3,239,519.

A wide variety of non-acidic dehydrating agents or desiccants can be used in the compositions of this invention. Such dehydrating agents that are capable of reducing the moisture content of air to between 0.002 and 3 mg./l. of air at 30.5° C. (when tested by the method of J. H. Bower in the Journal of Research of the Bureau of Standards, 12, 241 (1934)) are especially useful. Such operable dehydrating agents include anhydrous cupric sulfate, granular anhydrous calcium chloride, anhydrous calcium bromide, anhydrous zinc chloride, sodium hydroxide, potassium hydroxide, calcium oxide, magnesium oxide, anhydrous sodium sulfate, anyhdrous magnesium sulfate, anhydrous calcium sulfate, anhydrous aluminum sulfate, anhydrous sodium carbonate, activated silica gel, and activated alumina. The amount of such dehydrating agent employed is that sufficient to remove excess water from the composition and to control water, vapor or liquid, that may be introduced by the air or oxygen admitted to the composition to produce oxyluminescence. Commercially available dehydrating agents are satisfactory for use in this invention.

When dehydrating agents of highest dehydrating power are used, they may reduce the concentration of water in the composition to such a low level that there is no appreciable activation of the tetrakis(disubstituted-amino)-ethylene. In such cases, other hydroxyl-containing activators, e.g., alcohols or carboxylic acids that are not affected by the dehydrating agent, can be added to the composition to obtain the desired intensity and duration of light emission.

In addition to their effectiveness in enhancing the oxyluminescence of tetrakis(disubstituted-amino)ethylenes exposed to a humid atmosphere as described above, alkali and alkaline earth metal hydroxides (or compounds that react with water to form alkali or alkaline earth metal hydroxides) also improve the oxyluminescence of such peraminoethylene compositions in direct contact with water. The presence of the alkali or alkaline earth metal hydroxide also tends to maintain the initial blue-green color of luminescence to which the eye is most sensitive, and to minimize formation of orange or brownish-yellow colored materials which shift the color of the light emitted from the peraminoethylene composition toward the yellow to which the eye is less sensitive and thus, in effect, reduce the intensity of useful light. The alkaline materials that are effective in this manner include lithium, sodium, potassium, rubidium, cesium, calcium, strontium and barium hydroxides and the corresponding metal oxides, hydrides and peroxides that react with water to yield the alkali or alkaline earth metal hydroxide, e.g., lithium, sodium, potassium, calcium, and strontium hydrides, oxides, and peroxides. These alkali and alkaline earth metal compounds are especially effective when used in proportions ranging from 3–75% of the weight of the oxyluminescent peraminoethylene.

The oxyluminescent compositions of this invention preferably include inert, non-quenching carriers or solvents such as hydrocarbons, e.g., decane and mineral oil; non-quenching synthetic oils, e.g., silicone oils and polyalkylene glycols; non-quenching esters such as ethyl acetate; and the like. They also preferably include inert, compatible, non-quenching organic or inorganic thickening agents. Examples of suitable thickening agents include non-reducible, noncoordinated inorganic oxides, preferably in colloidal dispersion, such as silica and alumina; organic non-quenching polymers, e.g., polyisobutylene, polyethylene, polyvinyl acetate, polytetramethylene oxide; hydrocarbon waxes, e.g., petrolatum, ozokerite, and the like. The compositions can also include coloring agents, e.g., dyes and pigments, to modify the color of light emitted.

The following examples illustrate the compositions of this invention in greater detail. In these examples the proportions of ingredients are expressed in parts by weight unless otherwise specified.

*Example 1*

In a nitrogen atmosphere a mixture of 5 parts of petrolatum, 5 parts of white, high-melting ozokerite, 5 parts of 100-mesh anhydrous calcium chloride, and 4.3 parts of tetrakis(dimethylamino)ethylene is heated and blended at about 70° C. Cylindrical metal containers 1⅜″ in diameter and ²¹⁄₃₂″ deep are charged with approximately 6 ml. portions of the above composition. The charged containers are allowed to cool to room temperature whereupon the wax composition solidifies at the bottom of the containers. Lids are placed on the containers and sealed with molten wax. The closed containers are then stored at ordinary temperature.

A control composition comprising 10 parts of petrolatum, 5 parts of white, high-melting ozokerite, and 4.3 parts of tetrakis(dimethylamino)ethylene is packaged similarly.

After storage for a day, a container of the composition containing the dehydrating agent is opened. The oxyluminescent composition is manipulated to expose a fresh surface, and the composition is then exposed to an atmosphere of high relative humidity (90–100% R.H. at about 25° C.). The light emitted is measured with a sensitive photometer.

A container of the control composition is exposed to the same humid atmosphere and the light emission is measured in the same way. The results of these light emission tests are summarized in the following table:

| Type Composition | Brightness, foot lamberts | | | | | | |
|---|---|---|---|---|---|---|---|
| | 5 min. | 10 min. | 20 min. | 30 min. | 40 min. | 50 min. | 60 min. |
| With CaCl₂ | 2.5 | 3.0 | 0.95 | 0.38 | 0.18 | 0.11 | 0.086 |
| Control | 0.95 | 0.28 | 0.11 | 0.09 | 0.072 | 0.072 | 0.06 |

These results show the superiority of light emission provided by the composition containing the dehydrating agent.

When the control composition containing no dehydrating agent is exposed to a relatively dry atmosphere (ambient in the laboratory on a dry winter day), the composition emits light at a moderate level for a long time as shown by the following data:

| Composition—Control: | Brightness, foot lamberts |
|---|---|
| 5 min. | 0.38 |
| 15 min. | 0.62 |
| 30 min. | 0.80 |
| 60 min. | 0.62 |
| 90 min. | 0.26 |
| 120 min. | 0.11 |

*Example 2*

A composition comprising 10 parts of petrolatum, 5 parts of white, high-melting ozokerite, one part of anhydrous calcium sulfate, and 4.3 parts of tetrakis(dimethylamino)ethylene is prepared as described in Example 1 and approximately 6 ml. portions of the composition are sealed in metal containers, as described in Example 1. The charged containers are allowed to cool to room temperature. When cooled, one of the containers is opened in a humid atmosphere (90–100% R.H. at about 25° C.), and the composition is manipulated to expose a fresh surface. The light emitter is measured with a sensitive photometer with the following results:

| Composition with CaSO₄: | Brightness, foot lamberts |
|---|---|
| 5 min. | 3.4 |
| 10 min. | 1.3 |
| 15 min. | 0.46 |
| 20 min. | 0.23 |
| 30 min. | 0.14 |
| 40 min. | 0.086 |

*Examples 3–5*

Compositions comprising five parts of petrolatum, five parts of white, high-melting ozokerite, 4.3 parts of tetrakis(dimethylamino)ethylene, and five parts of the specific dehydrating agents listed in the following table are sealed in metal containers, as described in Example 1. The containers are opened in a humid atmosphere (90–100% R.H. at about 25° C.), and the compositions are manipulated to expose fresh surfaces. The light emitted is measured with a sensitive photometer with the following results:

| Example | Dehydrating Agent | Brightness, foot lamberts | | | | | | |
|---|---|---|---|---|---|---|---|---|
| | | 5 min. | 10 min. | 20 min. | 30 min. | 40 min. | 50 min. | 60 min. |
| 3 | 100 mesh NaOH | 1.6 | 0.76 | 0.31 | 0.21 | 0.20 | 0.11 | .10 |
| 4 | 100 mesh Na₂CO₃ | 4.1 | 1.2 | 0.11 | 0.10 | | | |
| 5 | 100 mesh CaO | 5.9 | 0.38 | 0.10 | | | | |
| Control | None | 1.0 | 0.3 | 0.11 | 0.09 | 0.07 | | .06 |

The observed light output either is much higher than that of the control during the early stages of the light emission or is higher than that of the control throughout the entire period of light emission.

*Examples 6–7*

Compositions containing no dehydrating agent and containing the specific dehydrating agents listed in the following table are prepared as described in Example 1, and approximately 6 ml. portions are placed in metal containers, as described in Example 1. The containers are stored in air for several months. The containers are opened in a highly humid atmosphere (90–100% R.H. at approximately 25° C.), and the compositions are manipulated to expose a fresh surface. The light that is emitted is measured with a sensitive photometer with the following results:

| Example | Dehydrating Agent | Age, months | Brightness, Foot Lamberts | | | | |
|---|---|---|---|---|---|---|---|
| | | | 5 min. | 10 min. | 20 min. | 30 min. | 40 min. |
| 6 | 100 mesh CaCl₂ | 10 | 2.2 | 1.6 | 0.36 | 0.12 | 0.08 |
| 7 | 100 mesh NaOH | 10 | 1.3 | 0.95 | 0.21 | 0.11 | 0.08 |
| Control | None | 11 | 1.2 | 0.38 | 0.12 | 0.06 | 0.03 |
| | None | 11 | 1.4 | 0.38 | 0.11 | 0.07 | 0.05 |
| | None | 6 | 1.8 | 0.28 | 0.10 | 0.07 | 0.05 |

From these results it is evident that both compositions containing dehydrating agents are superior to the control compositions in light emission in a humid atmosphere, even after a storage period of nearly a year.

*Example 8*

Six parts of pyrogenic silica having a particle size of about 12 millimicrons and a surface area of 175 sq. m./g. (BET surface area by $N_2$ adsorption) is added to 10 parts of a 58% (by weight) dispersion of sodium hydride in mineral oil. This pyrogenic silica has a hydrophobic surface because of reaction of about 30% of the surface hydroxyls with dichlorodimethylsilane such that the remaining surface hydroxyls assay 0.39 meq./g., and has a carbon content of 1.4%. The mixture is alternately evacuated to about 1 mm. mercury pressure and then pressured with nitrogen three times to remove air. The mixture is evacuated again and 86 parts of acid-washed Stoddard solvent (a petroleum distillate) and 34.5 parts of tetrakis(dimethylamino)ethylene are added. Nitrogen is admitted up to a pressure of one atmosphere, and the mixture is stirred or agitated until uniform. The consistency of the composition is partly that of a mush and partly that of a grease.

An aliquot of the composition is placed on water in an atmosphere of air. In a darkened area the floating composition is seen to glow brightly. Its brightness is measured with a calibrated photometer as follows:

Brightness in foot lambers at—
  5 min. _____ 1.5
  15 min. _____ 1.4
  30 min. _____ 1.2
  45 min. _____ 1.2
  1 hr. _____ 1.0
  2 hrs. _____ 0.52

At the start the aliquot hangs together well. As time goes on the sodium hydride reacts with water to produce hydrogen and sodium hydroxide. The hydrogen causes the mixture to foam and churn mildly so that fresh surface is exposed to air. This action also decreases the coherence of the mass such that after about one hour it is more or less easily disrupted by wave action. Nonetheless it continues to emit light at a good level well beyond this point. The sodium hydroxide tends to maintain the initial blue-green color to which the eye is most sensitive and to prevent or minimize the formation of an orange or brownish yellow material, thought to be a radical ion from partial oxidation of some of the peraminoethylene. The colored material shifts the color of the light emitted from the oxyluminescent reaction away from the blue-green toward the yellow where the eye is less sensitive and thus in effect reduces the intensity of the light as detected by the eye.

For comparison with the above composition, a control composition without sodium hydride is prepared similarly from 6 parts of the same silica, 94 parts of acid-washed Stoddard solvent and 34.5 parts of tetrakis(dimethylamino)ethylene. An aliquot of the control is floated on water and the light that is emitted is measured in a dark area as follows:

Brightness, foot lamberts at—
  5 min. _____ 0.75
  15 min. _____ 0.55
  30 min. _____ 0.28
  1 hr. _____ 0.18
  2 hrs. _____ 0.11

After 30 minutes the aliquot is orange on top and the light emitted is much yellower than at the start. The superiority of the composition containing the sodium hydride over that of the control is readily apparent from the above tests.

*Example 9*

A composition is prepared as in Example 8 using 10 parts of the same pyrogenic silica, 10 parts of a 58% dispersion of sodium hydride in mineral oil, 86 parts of acid-washed Stoddard solvent and 34.5 parts of tetrakis(dimethylamino)ethylene. The percentage of silica in the final mixture is 7.1 as compared with 4.4 in the mixture of Example 8. The higher amount of silica results in a more viscous, drier composition. An aliquot is placed on water and the light that is emitted is measured as follows:

Brightness, foot lamberts at—
  5 min. _____ 2.2
  15 min. _____ 1.3
  30 min. _____ 1.3
  45 min. _____ 1.4
  1 hr. _____ 1.1
  2 hrs. _____ 0.62

The higher brightness as compared with the composition of Example 8 is evidently due to a higher porosity and hence greater exposure to air in the composition containing the greater amount of the silica thickener.

*Example 10*

A composition is prepared as in Example 8 except the amount of silica is 5.8%. Part of it is packaged in pouches prepared from cold water-soluble polyvinyl alcohol film. Another part is packaged in pouches from polyethylene oxide film. Sufficient lead shot is included in the pouches to raise their density to slightly above that of sea water. The pouches are stored in sealed tin cans. When a light signal on water is desired, the cans are opened and the pouches are thrown into the water. The weighted pouches sink for a time until the film softens and allows the shot to fall out. The packages then float to the surface and begin to glow as the remainder of the film dissolves and allows the composition to contact air. The glow continues for at least six hours. Both the polyvinyl alcohol and polyethylene oxide packages behave in the same manner.

Still another part of the composition is packaged under nitrogen in a piston-type aerosol can fitted with a neoprene gasketed metal valve and plastic delivery spout having an internal diameter of 5.5 mm. at the outlet. The portion of the can below the piston is pressured with a fluorocarbon propellant. When the contents of the can are discharged onto water, the more or less rope-like material floats and soon begins to glow. Light emission continues for several hours.

*Example 11*

A composition is prepared as in Example 8 except that it contains 7.1% (10 parts) of the hydrophobic silica, 7.1% (10 parts) of powdered (100 mesh) sodium hydroxide, 61% (86 parts) of acid-washed Stoddard solvent and 24.5% (34.5 parts) of tetrakis(dimethylamino)ethylene. An aliquot is placed on water and the light that is emitted is measured as follows:

Brightness, foot lamberts at—
| | |
|---|---|
| 15 min. | 0.90 |
| 30 min. | 0.30 |
| 1 hr. | 0.20 |
| 2 hrs. | 0.16 |

The composition hangs together well and resists wave action even at one hour. The emitted light becomes somewhat yellower with time but not nearly as much as that of the control composition of Example 8.

Example 12

A composition is prepared as in Example 8 except that it contains 5.8% (8 parts) of the hydrophobic silica, 7.2% (10 parts) of 100 mesh sodium peroxide, 62% (86 parts) of acid-washed Stoddard solvent, and 25% (34.5 parts) of tetrakis(dimethylamino)ethylene. An aliquot of the composition is floated on water and the light that is emitted is measured as follows:

Brightness, foot lamberts at—
| | |
|---|---|
| 5 min. | 1.3 |
| 30 min. | 0.71 |
| 1 hr. | 0.43 |
| 2 hrs. | 0.28 |
| 4 hrs. | 0.17 |
| 7 hrs. | 0.11 |

Example 13

A composition is prepared as in Example 8 except that it contains 7.1% (10 parts) of polyethylene having a specific gravity of 0.916 and a melt index of 22, in place of the silica, 7.1% (10 parts) of 100 mesh sodium peroxide, 61% (86 parts) of acid-washed Stoddard solvent and 24% (34.5 parts) of tetrakis(dimethylamino)ethylene. After the materials are mixed under nitrogen, the container and contents are heated to about 100° C. for several minutes with mild agitation until the polyethylene dissolves. The container is then rolled during cooling to keep the undissolved sodium peroxide in suspension until the composition gels. The consistency of the final product is more or less that of mush.

An aliquot of the composition is placed on water and the light that is emitted is measured as follows:

Brigtness, foot lamberts at—
| | |
|---|---|
| 5 min. | 0.75 |
| 15 min. | 1.7 |
| 30 min. | 2.5 |
| 1 hr. | 1.2 |
| 2 hr. | 0.40 |
| 3 hr. | 0.19 |
| 5 hr. | 0.07 |
| 7 hr. | 0.07 |

The composition holds together well and has good resistance to disruption by wave action. It maintains its original blue-green color well for at least 2 hours when exposed to the air. The light emission increases during the first half hour probably because of slow diffusion of oxygen into the interior and slow interaction of water with the sodium peroxide with evolution of additional oxygen.

Example 14

Additional compositions are prepared as in Example 13 except that they contain the materials and proportions shown in the following table:

| No. | Polyethylene, percent | Alkaline Material | Solvent, percent | Tetrakis-dimethyl-amino-ethylene, percent | Other |
|---|---|---|---|---|---|
| A | 7 | 14% 200 mesh $Na_2O_2$ | 55 | 24 | |
| B | 7.4 | 3.7% 200 mesh $Na_2O_2$ | 64 | 25 | |
| C | 5.9 | 7.5% 200 mesh $Na_2O_2$ | 61 | 26 | |
| D | 10.7 | 4.1% sodium hydride | 61 | 24 | |
| E | 7.1 | 7.1% 200 mesh $Na_2O_2$ | 58 | 24 | (1) |

[1] 3.5% hollow glass spheres having a bulk density of 0.095.

C is a thin mush that flows under gravity. A, B and E are moderately thick mushes that exude a little clear liquid on standing. D is a thick mush that does not exude.

Aliquots of the compositions are floated on water and the light that is emitted is measured as follows:

| No. | Brightness, foot lamberts at— | | | | | |
|---|---|---|---|---|---|---|
| | 5 min. | 15 min. | 30 min. | 1 hr. | 3 hr. | 5 hr. |
| A | 0.62 | 1.0 | 1.3 | 1.5 | 0.40 | 0.33 |
| B | 1.0 | 1.6 | 1.4 | 0.9 | 0.38 | 0.33 |
| C | 0.40 | 0.7 | 0.95 | 1.1 | 0.48 | 0.36 |
| D | 1.1 | 1.7 | 1.6 | 1.2 | 0.48 | 0.28 |
| E | 1.2 | 1.9 | 1.7 | 1.4 | 0.55 | 0.38 |

The aliquot E floats higher on the water than the rest because of its content of low-density, hollow, glass spheres. After 30 minutes on water, A, B, and E have good resistance to dispersal by wave action, D has fair resistance, and C has relatively poor resistance. After two hours, A, B, and E still have good resistance to wave action. C and D have relatively poor resistance to wave action, but they still display good light emisison. All of them continue to emit light at a useful level for emergency rescue operations for at least five hours.

Example 15

In a nitrogen atmosphere a composition is prepared containing 15 parts of low molecular weight polyethylene having a melt index of 22, 10 parts of finely ground calcium oxide of about 200 mesh, 34.4 parts of tetrakis(dimethylamino)ethylene, and 86.2 parts of acid-washed kerosene. The mixture is heated at about 100° C. until the polyethylene dissolves. It is then cooled while being agitated to keep the oxide suspended uniformly while the polymer precipitates and converts the composition to a mush.

An aliquot of the composition is floated on water and the light emission is measured with a photometer as follows:

Brightness, foot lamberts at—
| | |
|---|---|
| 5 min. | 3.0 |
| 15 min. | 3.2 |
| 30 min. | 2.2 |
| 1 hr. | 1.0 |
| 2 hrs. | 0.62 |

The composition maintains its original blue-green color during this time of exposure on water.

In view of the marked improvement in intensity and reproducibility of the light emisison of the compositions of this invention on exposure to humid air, they are especially useful in those applications where reliable emergency light sources are essential even under adverse conditions in widely different climates, especially those having extremely high humidities.

The oxyluminescent peraminoethylene compositions of this invention comprising an alkali or alkaline earth metal hydroxide or an alkali or alkaline earth metal compound that reacts with water to form an alkali or alkaline earth metal hydroxide, an aliphatic hydrocarbon solvent, and a hydrophobic thickener such as pyrogenic silica or polyethylene, are especially suitable for use as emergency light sources to aid rescue operations on water, especially to aid rescue operations for ships and aircraft disabled on the sea.

I claim:

1. An oxyluminescent composition comprising tetrakis-(disubstituted-amino)ethylene of the formula $$(R_2N)_2C=C(NR_2)_2$$

wherein the R's can be the same or different and are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, and from 2% to 200%, by weight of the tetrakis(disubstituted-amino)ethylene, of at least one member selected from the class consisting of a dehydrating agent inert to the tetrakis(disubstituted-amino)-ethylene and its oxidation products, an alkali metal hydroxide, an alkaline earth metal hydroxide, and a compound that reacts with water to form an alkali or alkaline earth metal hydroxide.

2. A composition of claim 1 wherein the tetrakis(disubstituted-amino)ethylene is tetrakis(dimethylamino)ethylene.

3. A composition of claim 1 containing, additionally, at least one inert, compatible, non-quenching thickening agent.

4. A composition of claim 1 containing, additionally, an aliphatic hydrocarbon solvent and a hydrophobic thickener selected from the class consisting of pyrogenic silica and polyethylene.

5. A composition of claim 1 wherein the tetrakis(disubstituted-amino) is tetrakis(dimethylamino)ethylene, the alkali metal hydroxide is sodium hydroxide or a compound that reacts with water to form sodium hydroxide.

6. An oxyluminescent composition of claim 1 enclosed in a pouch of polyvinyl alcohol film or polyethylene oxide film in which the tetrakis(disubstituted-amino)ethylene is tetrakis(dimethylamino)ethylene, and the alkali metal hydroxide is sodium hydroxide or a compound that reacts with water to form sodium hydroxide, and containing additionally, an aliphatic hydrocarbon solvent and pyrogenic silica.

7. A composition of claim 1 wherein the tetrakis(disubstituted-amino)ethylene is tetrakis(dimethylamino)ethylene and containing additionally, as thickening agents, petrolatum and ozokerite.

8. A composition of claim 1 wherein the tetrakis(disubstituted-amino)ethylene is tetrakis(dimethylamino)ethylene and the dehydrating agent is anhydrous calcium chloride or anhydrous calcium sulfate.

9. A composition of claim 1 wherein the tetrakis(disubstituted-amino)ethylene is tetrakis(dimethylamino)ethylene and the dehydrating agent is anhydrous calcium chloride or anhydrous calcium sulfate and containing additionally, petrolatum and ozokerite.

References Cited by the Examiner
UNITED STATES PATENTS

| | | | |
|---|---|---|---|
| 3,211,665 | 10/1965 | Allen et al. | 252—301.2 |
| 3,239,406 | 3/1966 | Coffman et al. | 252—301.2 X |
| 3,239,519 | 3/1966 | Winberg | 252—301.2 X |
| 3,264,221 | 8/1966 | Winberg | 252—301.2 X |

CARL D. QUARFORTH, *Primary Examiner.*

S. J. LECHERT, Jr., *Assistant Examiner.*

UNITED STATES PATENT OFFICE
CERTIFICATE OF CORRECTION

Patent No. 3,311,564　　　　　　　　　　　　　　　　March 28, 1967

Edward T. Cline

It is hereby certified that error appears in the above numbered patent requiring correction and that the said Letters Patent should read as corrected below.

Column 9, line 33, before "is" insert -- ethylene --.

Signed and sealed this 27th day of August 1968.

(SEAL)
Attest:

Edward M. Fletcher, Jr.　　　　　　　　　　　　　　　EDWARD J. BRENNER
Attesting Officer　　　　　　　　　　　　　　　　　　Commissioner of Patents